Figure 3:
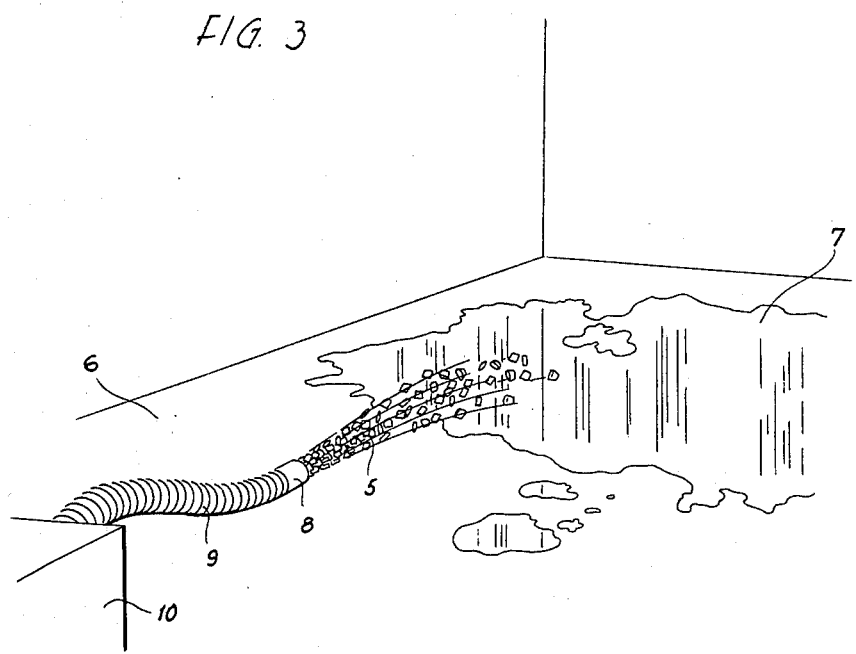

United States Patent [19]

Eriksson et al.

[11] 4,401,475
[45] Aug. 30, 1983

[54] METHOD OF CLEARING AWAY LIQUID

[76] Inventors: Hans Eriksson, Nygatan 11; Sylve Rönndahl, Drevstagatan 3, both of 681 00 Kristinehamn, Sweden

[21] Appl. No.: 411,301

[22] Filed: Aug. 25, 1982

Related U.S. Application Data

[63] Continuation of Ser. No. 284,201, Jul. 17, 1981, abandoned.

[30] Foreign Application Priority Data

Aug. 5, 1980 [SE] Sweden .............................. 8005547

[51] Int. Cl.³ .............................................. B08B 7/00
[52] U.S. Cl. .......................................... 134/6; 134/7; 210/691; 210/924; 15/104 R; 15/244 B; 100/123
[58] Field of Search ............... 210/690, 691, 692, 693, 210/694, 924; 134/6, 7, 10; 15/104 R, 244 B; 100/123

[56] References Cited

U.S. PATENT DOCUMENTS

| | | | |
|---|---|---|---|
| 2,958,885 | 11/1960 | Donney | 15/244 B |
| 3,607,741 | 9/1971 | Sohnius | 210/691 |
| 3,657,119 | 4/1972 | Turbeville | 210/693 |
| 3,728,208 | 4/1973 | Whittington | 210/691 |
| 3,791,990 | 2/1974 | Fischer | 210/924 |
| 3,800,950 | 4/1974 | Hess | 210/924 |
| 3,904,528 | 9/1975 | Yocum | 210/924 |
| 4,061,573 | 12/1977 | Biron | 210/694 |
| 4,111,813 | 9/1978 | Preus | 210/924 |
| 4,169,052 | 9/1979 | Bocard | 134/7 |
| 4,234,420 | 11/1980 | Turbeville | 210/924 |

FOREIGN PATENT DOCUMENTS 27359  4/1981  European Pat. Off. ............ 210/691

Primary Examiner—Ernest G. Therkorn
Attorney, Agent, or Firm—Dennison, Meserole, Pollack & Scheiner

[57] ABSTRACT

Less viscous liquids (7) such as diesel oil may be unintentionally spread on water surfaces or on the ground (6). Loose sawdust (2) or chemicals are used to clear said surfaces (6). These clearing aids (2) with the liquid (7) absorbed in them are difficult to remove. The use of cases (5) of filter material, filled with sawdust (2) provides an aid which is easy to remove when the liquid has been cleared.

9 Claims, 5 Drawing Figures

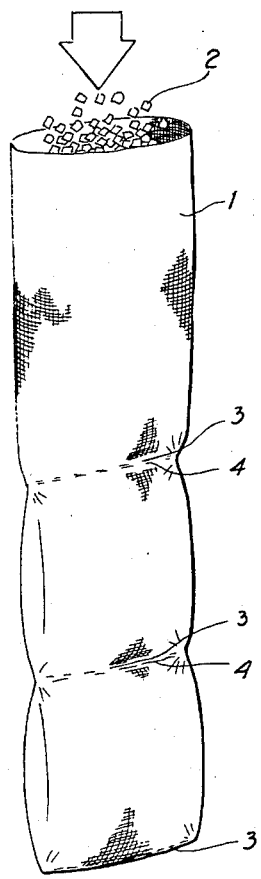
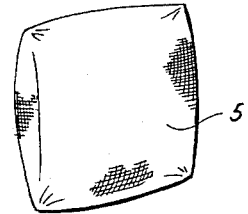
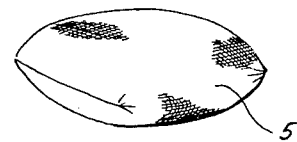
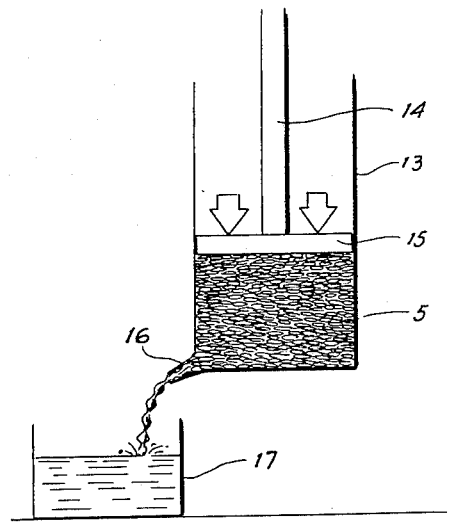

METHOD OF CLEARING AWAY LIQUID

This application is a continuation, division, of application Ser. No. 284,201, filed July 17, 1981, now abandoned.

The present invention relates to a method of clearing away liquid. The liquid to be cleared away may be any type of liquid. It may be a chemical liquid, milk, water or it may be a petroleum product. The invention is directed primarily to a method of clearing away petroleum products which can pass through a filter of woven fabric, paper or other suitable material which can be used as a filter. The object of the invention is to remove petroleum products which have been accidentally spilled on floor or ground surfaces or on water. Loose sawdust has so far been used to remove petroleum products. The sawdust easily absorbs the petroleum products but sawdust with absorbed petroleum products is difficult to remove from the surface with the undesired petroleum products and it is impossible to avoid some of the sawdust remaining on the cleared surface.

The object of the present invention is, with the aid of an absorbent material such as sawdust, to remove unwanted liquid petroleum products in such a way that the absorbent material can without difficulty be totally removed from the surface carrying the unwanted petroleum product. This is enabled according to the present invention in that cases of a filter-like material are completely filled with absorbent material and then sealed. Whole units containing material which will absorb liquid are thus obtained. The case may be made of paper, woven fabric or other suitable material for diffusing petroleum products. A surface over which undesired petroleum products have been spilled is covered with cases over at least the part of the surface carrying the petroleum products. Absorption is rather rapid and when it is finished, all that remains is to remove the cases with a shovel or other suitable implement. This is extremely simple since the cases are generally at least 1 $cm^3$.

If the cases with absorption material are spread over the surface of water on which there is a layer of undesired petroleum product, they have the advantage that they will not sink to the bottom below said surface.

The cases can be kept in a store and sprayed out by suitable means over the surface to be covered by them.

A suitable material for the cases may be material used for medical purposes such as gauze bandage or gauze hosing used for slipping over fingers and other parts of the human body.

Sawdust, peat or other similar material is suitable as the material absorbing liquid. In the case of peat, it is advisable to use peat which has been thermally treated so that it is suitable for use in removing petroleum products. Such peat is manufactured by Vapo.

Further characteristics of the present invention are revealed in the following claims.

Figure 4:
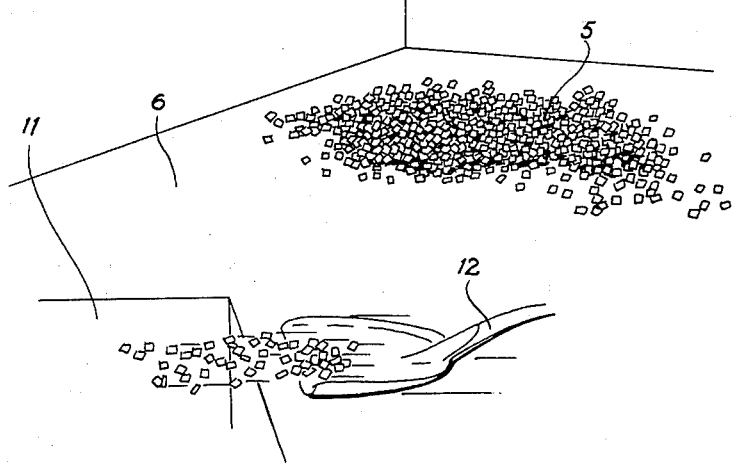

The present invention will be further described with reference to the accompany two sheets of drawings in which FIG. 1 shows a tube of gauze being filled with material which will absorb liquid, FIG. 2 shows a finished case containing absorbent material, FIG. 3 shows a surface with undesired liquid on it and being sprayed with cases containing absorbent material, FIG. 4 shows how the cases supplied in accordance with FIG. 3 have absorbed the liquid in FIG. 3, and FIG. 5 shows a pressing means where the liquid absorbed by the cases can be recovered.

FIG. 1 shows a gauze tube or hose 1. Such a hose is used for medical purposes and goes under the name of tubular gauze. The hose is closed at its lower end and then filled with a liquid-absorbent material, sawdust in the present case. Naturally other liquid-absorbent materials such as peat may also be used. The liquid-absorbent material is designated 2. As the tube 1 is filled it is provided with two transverse seams 3 and 4. The transverse seams are axially spaced from each other and if a cut is made between the top lowermost transverse seams, one unit will be released consisting of a case 5 containing absorbent material 2. The filled case will be substantially shaped as a cushion as can be seen at the bottom of FIG. 1 and in FIG. 2. The filled case 5 suitably has a volume of about 4 $cm^3$ but may also have smaller or larger volume. The main point is that there is enough absorbent material in a casing to enable all the material to absorb liquid when necessary. If too much filler is used the liquid may only penetrate to a certain depth and the material in the middle will not be utilized. This is uneconomic.

Practical experiments have shown that a unit containing sawdust can absorb liquid up to a height of 8 cm. FIG. 3 shows a floor surface 6 on which a liquid 7, diesel oil for instance, has been spilled. To remove said diesel oil 7 a container or store 10 is used, filled with cases containing absorbent material and having a volume of about 4 $cm^3$. The container is provided with an exhaust means to blow out the cases through the tube 9 and the tube is provided at its free end with a nozzle 8 where the cases leave the tube. The cases are sprayed out over the liquid spill 7 through the tube and nozzle. The entire liquid spill 7 can be covered by cases 5. Said cases 5 have rapid absorbency and after a short while all the liquid 7 has been absorbed by the material in the cases 5.

FIG. 4 shows how the liquid spill 7 has disappeared and there remain only a number of cases filled with spilled liquid on the floor surface. Thanks to their size, the cases are easy to remove from the surface 6 with a shovel 12 or any other suitable form of suction means. If a shovel is used, the cases with absorbed liquid are placed in a container 11.

The above is a description of how to clear away a liquid spill on a floor surface with the help of cases 5. However, it should be clear that said cases can also be sprayed over a water surface where there is a path of liquid which is not water. The cases 5 are sprayed over said patch in the same way as in FIG. 3 and after a while all the cases can be removed, thus removing the liquid patch as well. Furthermore, according to the present invention the cases have the advantage that when they are sprayed out over the surface of water they cannot sink.

Although it is simplest to work with cases having a volume of about 4 $cm^3$, in certain cases a mat of sizeable dimensions may be used to clear a surface which is not liquid. The mat may have a height of about 5 cm and a length and breadth of up to 35 cm and 20 cm or even larger. It has been found that a mat 20×35×5 cm and filled with sawdust, weighs about 1 kg and can absorb a good 3 liters of petroleum products.

The cases 5 of varying sizes mentioned above can be supplied to the surfaces where they are needed in various ways. They can be dropped from the air, for instance, or supplied in any other suitable manner.

The cases with liquid-absorbent material which have performed their function in absorbing liquid are supplied to a press means 13 containing a piston 14 and plunger 15. The press means 13 is filled with cases 5 and by compressing the cases in the press 13 the liquid absorbed can be pressed out and leaves the means 13 through a bottom outlet 16. Liquid from the outlet is led to a vessel 17. Liquid collected in the vessel can be re-used and a saving is thus made. If the liquid collected in the container 17 is a petroleum product, the compressed cases 5 with absorbent material in the press means 13 can be used as pro-environmental fuel. However, this is provided the case material is also pro-environmental when burnt as is the case if it is made of tubular gauze.

We claim:

1. Method of utilizing a flowable absorbent material for the absorbing and clearing of liquid spills from a surface area, comprising filling said material into a plurality of cases of liquid-passing filter material, sealing said cases with the absorbent material therein to define individual cases with a volume of about 1 cm$^3$ to about 4 cm$^3$, spreading multiple filled cases over the surface to cover the area to be cleared, allowing the cases with enclosed absorbent material to absorb the liquid to be cleared away, and removing the cases with the absorbed liquid.

2. Method according to claim 1 wherein the removed cases are conveyed to a pressing means and the cases compressed to recover the liquid absorbed by the cases and their contents.

3. Method according to claim 2 wherein the cases with their contents, after being compressed, are supplied to a combustion means or the like for use as combustion fuel.

4. Method according to claim 1 wherein the cases with their contents are spread by blowing.

5. Method according to claim 1 wherein the filling of the absorbent material into cases involves providing an elongated gauze hosing closed at the lower end thereof, partially filling the hose and providing a pair of transverse closure seams across the hose immediately above the filling to provide a sealed case at the lower portion of the hose, and severing the hose between the closure seams to separate the sealed case therefrom.

6. Method according to claim 1 wherein each case is of such a volume that all the filler absorbs liquid.

7. Method of utilizing a flowable absorbent material for absorbing and clearing of liquid spills from a surface area, comprising filling said material into a plurality of cases of liquid-passing filter material, sealing said cases with the absorbent material therein to define individual cases with a volume sufficiently small to allow spreading of multiple filled cases over the surface to cover the area to be cleared and to allow removal of the cases therefrom in the manner of a flowable material, said filled cases, prior to removal, absorbing the liquid to be cleared away.

8. Method according to claim 7 wherein the cases with their contents are spread by blowing.

9. Method according to claim 7 wherein the filling of the absorbent material into cases involves providing an elongated gauze hosing closed at the lower end thereof, partially filling the hose and providing a pair of transverse closure seams across the hose immediately above the filling to provide a sealed case at the lower portion of the hose, and severing the hose between the closure seams to separate the sealed case therefrom.

* * * * *